Nov. 16, 1926. Re. 16,473

C. F. HUMPHREYS

SURFACE COVERING AND METHOD OF SIMULATING HANDLAID TILE THEREBY

Original Filed Feb. 25, 1925 2 Sheets-Sheet 1

INVENTOR

Charles F. Humphreys by his attorneys

Byrne, Stebbins & Pannell

Nov. 16, 1926. Re. 16,473

C. F. HUMPHREYS

SURFACE COVERING AND METHOD OF SIMULATING HANDLAID TILE THEREBY

Original Filed Feb. 25, 1925 2 Sheets-Sheet 2

INVENTOR

Charles F. Humphreys by his attorneys

Byrnes, Stebbins & Parmelee

Reissued Nov. 16, 1926. Re. 16,473

UNITED STATES PATENT OFFICE.

CHARLES F. HUMPHREYS, OF LANCASTER, PENNSYLVANIA, ASSIGNOR TO ARMSTRONG CORK COMPANY, A CORPORATION OF PENNSYLVANIA.

SURFACE COVERING AND METHOD OF SIMULATING HANDLAID TILE THEREBY.

Original No. 1,545,428, dated July 7, 1925, Serial No. 11,464, filed February 25, 1925. Application for reissue filed October 8, 1926. Serial No. 140,385.

The invention relates to surface coverings and more particularly to linoleums or similar hard surface floor coverings, such as felt base goods, and has as an object the provision of an improvement upon the invention disclosed and claimed in my Patent No. 1,520,130 dated December 23, 1924, reissued January 12, 1926, Reissue No. 16,250.

It is an object of the invention to utilize the nonuniformity of a limited number of units of differing appearance, and, in addition thereto, to insert, preferably in an apparently haphazard manner, other units differing from any of those already named.

A further object of the invention is the provision of a surface covering decorated by a pattern of shaped units, utilizing a limited number of differing appearances placed with studied non-uniformity, repeating the actual arrangement over spaces of sufficient extent to be not grasped by a single glance of the eye, and to intersperse in such an arrangement, preferably in an apparently haphazard manner, units having a variety of decorations.

A further object of the invention is the provision of a surface decorated as last described, wherein the haphazardly placed units, in successive areas, have the same pattern but a difference of color to further carry out the object of the invention.

Figure 1:
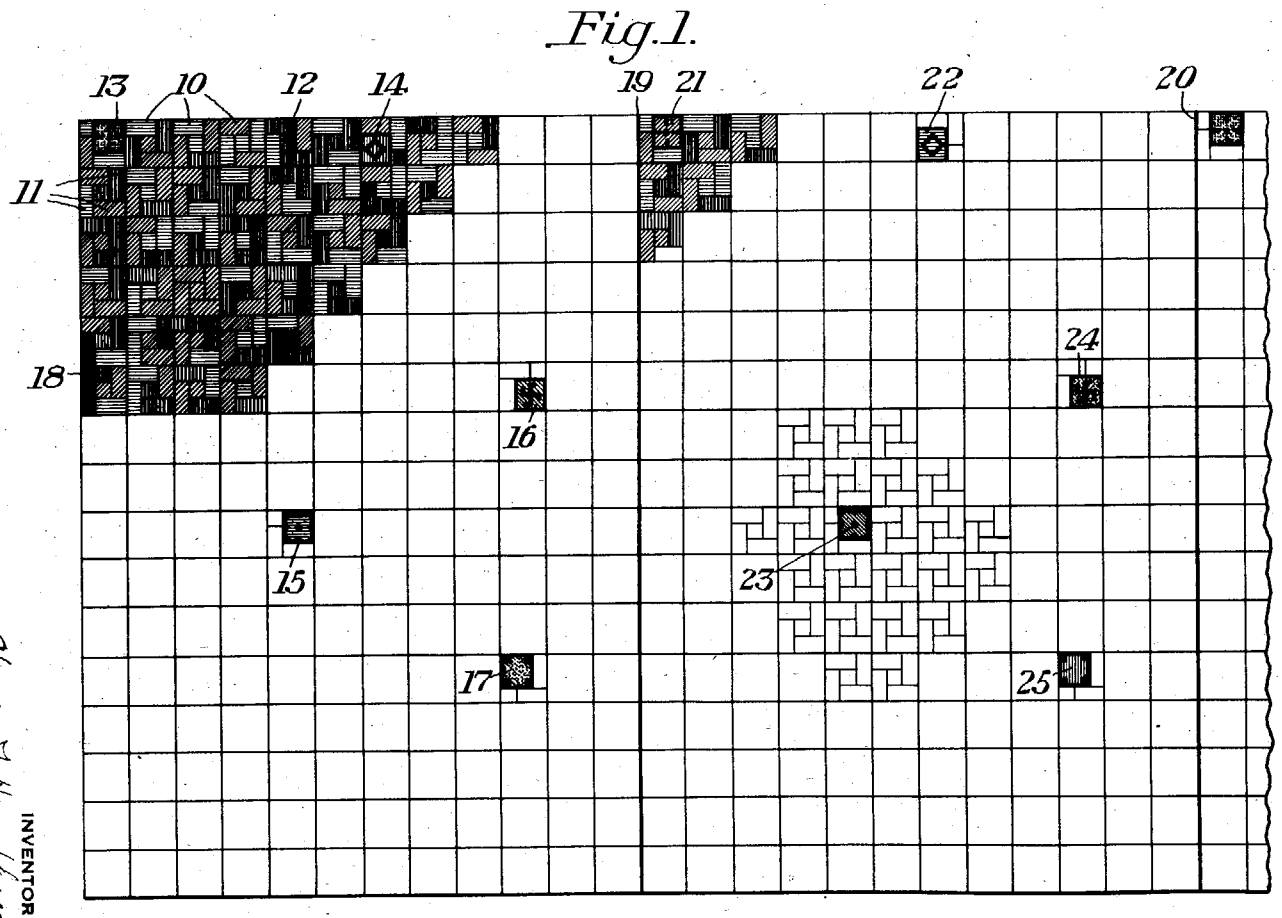
Figure 2:
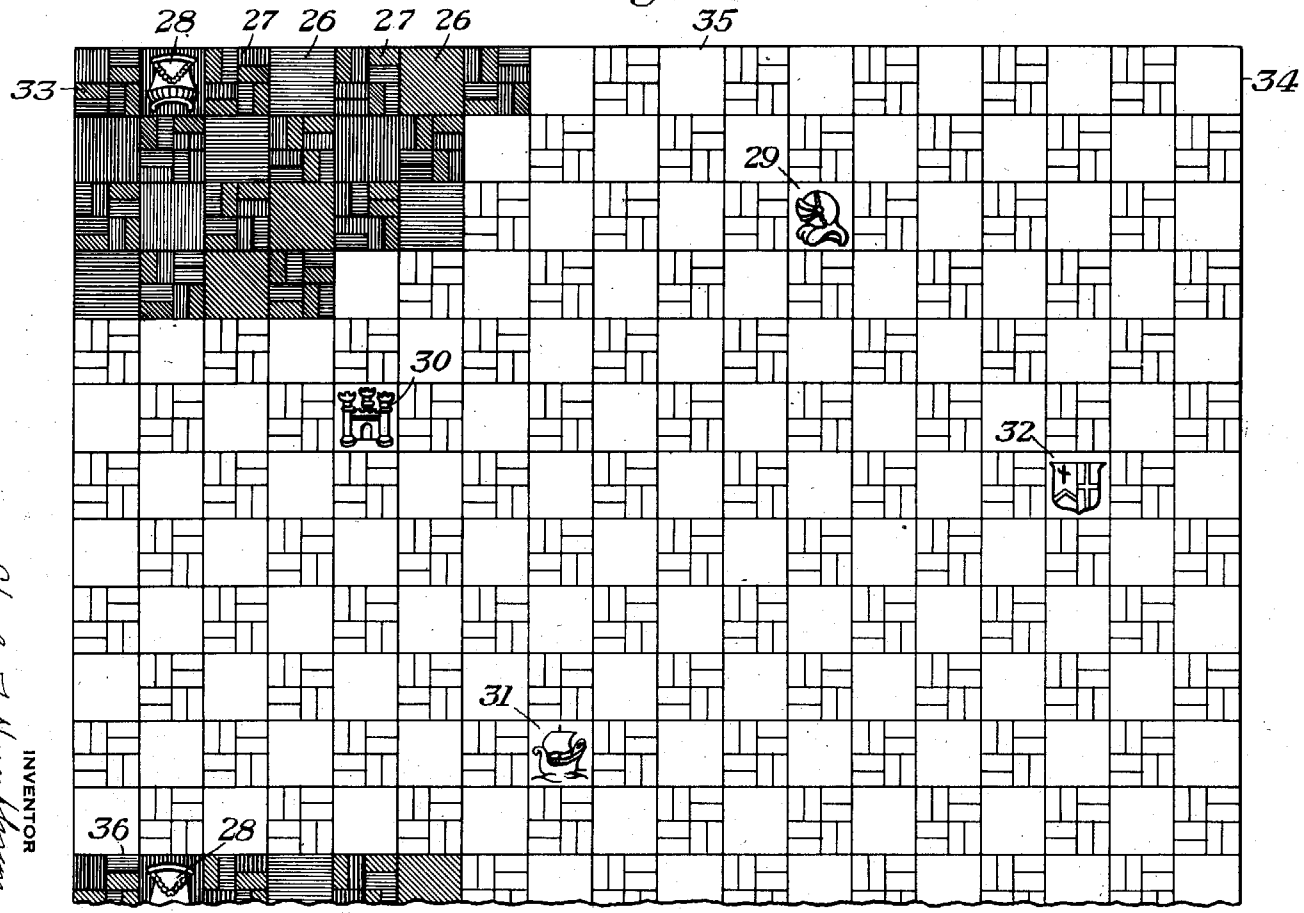

Further objects of the invention will appear from the following description when read in connection with the accompanying drawings, wherein Fig. 1 is a plan view of a surface covering showing a repetition of an actual arrangement; and Fig. 2 is a like view of a modified form.

As shown in Fig. 1, the surface is decorated by a plurality of squares 10, each square being formed of four rectangles 11 arranged about a center square 12.

In accordance with the principle already referred to and disclosed in my patent above identified, these rectangles 11 and central square 12 are made up of a limited number, say 3, of different colors or of different shades of the same color, thereby simulating burned tile which, because of the difference in intensity of heat at which they may be burned, come out of the kiln with different shades of color. In hand-laid tile, such as are taken promiscuously from stock, the differences in color occur haphazardly.

This haphazard arrangement is produced in a studied manner, and the arrangement is repeated over successive areas so large that the repeat is not readily apparent to the eye, as explained in my prior patent above referred to. The necessary size of such repeat areas varies with the size and arrangement of the tile-like units. In general, the smaller the individual tile-like units the smaller the areas over which the arrangement is repeated, and the larger the units and the more striking their appearance, the larger the areas necessary in order that the repeat be not readily apparent to the eye. It has been found that if there is no uniformity over a space of say 54 inches and throughout a width in linoleum of 6 feet, the eye cannot readily detect the repetition of such arrangement even with tile-like units of considerable size, while for the eye of the casual observer, the area of the pattern which is repeated may be considerably smaller, particularly if the tile-like units be small.

It will therefore be understood that the above dimensions are illustrative merely, and that for the repetition to be not readily apparent to the eye, the size of the repetition spaces may vary with the size and appearance of the vari-colored tile-like units, the individual eye and the distance and angle from which the surface is viewed.

It is of course necessary to repeat the pattern successively because of the necessity of forming the surfaces by machine as, for instance, the block, die, plate or stencil of a linoleum machine.

To carry forward the idea referred to, certain of the units of some of the squares 10 are replaced by a square decorated by a variety of designs, as shown at 13, 14, 15, 16 and 17. The placing of these units in the squares 10 is made to differ in the different instances and the squares 10, which are so treated, occur haphazardly.

The actual arrangement of the units 13 to 17 inclusive, which occurs in a space as from the lines 18 to 19, is then repeated over a space as from line 19 to line 20, using the same pattern of decoration for the squares 13 to 17 inclusive as is necessary to avoid the provision of a large number of parts of the machine utilized.

The variation in the appearance in the result is however further carried forward by the utilization of a different color or shade over successive areas, while using the repeating pattern. This is indicated on the drawings by the shading upon the squares 21 to 25 inclusive.

In the form of the invention shown in Fig. 2, the squares 26 are decorated as a single space and the alternate squares 27 by rectangular spaces. The squares 26 differ among themselves in appearance according to the principle of the former patent identified, and also the rectangles utilized in the squares 27 differ among themselves, and their arrangements in the various squares 27 are differentiated.

The haphazardly placed decorated squares 28, 29, 30, 31 and 32 are shown as decorated by squares embodying some heraldic figure. In this form of the invention, the width of the sheet of surface covering extends from lines 33 to 34 and the length of a unit of arrangement of decoration extending from the line 35 to the line 36.

As shown, the space arrangement between the lines 35 and 36 is again repeated at the bottom, a portion of the succeeding square 28 being shown. The successive squares 28 to 32 inclusive, in successive spaces, may or may not be differentiated by color while retaining the same pattern in the manner described in connection with Fig. 1, as desired.

The patterns shown, and the arrangement thereof, will be understood to be illustrative only, and any desired pattern may be utilized without departing from the spirit of the invention.

I claim:

1. The method of decorating a surface which comprises covering the surface with a pattern of spaces having a limited number of varying appearances, arranging the spaces of like appearance upon the surface with irregularity of occurrence, varying the decoration of certain of said spaces occurring haphazard by a decoration varying strikingly from that of the remaining spaces, and repeating the actual arrangement over an area so large as to be not perceived by a single glance of the eye, whereby to simulate the haphazard appearance of hand-laid tile.

2. The method of decorating a surface which comprises covering the surface with a pattern of spaces, decorating the said spaces by a pattern which occurs regularly, the elements of said pattern having a limited number of varying appearances, the units of varying appearance arranged with studied non-uniformity, replacing some of said units by a decoration differing strikingly from the remainder thereof, the placing of said last-named units differing among the spaces wherein they occur, and the spaces so treated occurring with non-uniformity in the entire pattern, and repeating the actual arrangement of decoration over an area so large as to be not perceived by a single glance of the eye.

3. The method of decorating a surface which comprises covering the surface with a pattern of spaces, decorating said spaces with a pattern which occurs regularly, the elements of said pattern having a limited number of varying appearances, the units of varying appearance arranged with studied non-uniformity, replacing some of said units by decoration differing strikingly from the remainder thereof, the placing of said last named units differing among the spaces wherein they occur, and the spaces so treated occurring with non-uniformity in the entire pattern, and repeating the actual arrangement of decoration over an area so large as to be not perceived by a single glance of the eye, the pattern of the units of striking contrast in successive areas having the same pattern but differing in color from adjacent areas.

4. A surface covering comprising in combination a series of spaces arranged in a pattern, the spaces comprising a limited number of varying appearances, the spaces of like appearance upon the surface arranged with irregularity of occurrence, certain of said spaces occurring with non-uniformity replaced by spaces of striking difference in appearance, and with the actual arrangements of decoration repeated over successive areas so large as to be not perceived by a single glance of the eye, whereby the assembled covering of a surface may simulate the haphazard appearance of hand-laid tiling.

5. A surface covering comprising in combination a series of spaces arranged in a pattern, the spaces comprising a limited number of varying appearances, spaces of like appearance upon the surface arranged with irregularity of occurrence, certain of said spaces being replaced by spaces of striking difference in appearance, and with the actual arrangements of decoration repeated over successive areas so large as to be not perceived by a single glance of the eye, whereby the assembled covering of a surface may simulate the haphazard appearance of hand-laid tiling.

6. A surface covering comprising a series of spaces having a limited number of varying appearances arranged in a pattern with irregularity of occurrence, said arrangement being repeated over successive areas of sufficient size so that the repeat is not readily apparent to the eye, certain of said spaces being replaced by spaces of strikingly different decorative appearance.

7. Linoleum or similar hard surface floor covering, comprising a series of tile-like spaces having a limited number of varying colors arranged in a pattern with irregularity of occurrence so as to simulate the haphazard appearance of hand-laid tiling, and having certain of said spaces replaced by tile-like spaces of strikingly different decorative appearance.

8. Linoleum or similar hard surface floor covering, comprising a series of tile-like spaces having a limited number of varying colors arranged in a pattern with irregularity of occurrence so as to simulate the haphazard appearance of hand-laid tiling, said arrangement being repeated over successive areas of sufficient size so that the repeat is not readily apparent to the eye, and having certain of said spaces replaced by tile-like spaces of strikingly different decorative appearance.

9. Linoleum or similar hard surface floor covering, comprising a series of tile-like spaces having a limited number of varying colors arranged in a pattern with irregularity of occurrence so as to simulate the haphazard appearance of hand-laid tile, said arrangement being repeated over successive areas of sufficient size so that the repeat is not readily apparent to the eye, and having certain of said spaces replaced by tile-like spaces of strikingly different decorative appearance, the color of such replacement spaces varying in different repeats.

In testimony whereof I have hereunto set my hand.

CHARLES F. HUMPHREYS.